United States Patent [19]

Rosenbaum et al.

[11] Patent Number: 5,341,407
[45] Date of Patent: Aug. 23, 1994

[54] INNER LINERS FOR FUEL CLADDING HAVING ZIRCONIUM BARRIERS LAYERS

[75] Inventors: Herman S. Rosenbaum, Fremont; Joseph S. Armijo, Saratoga, both of Calif.

[73] Assignee: General Electric Company, San Jose, Calif.

[21] Appl. No.: 92,188

[22] Filed: Jul. 14, 1993

[51] Int. Cl.$^5$ .................................................. G21C 3/00
[52] U.S. Cl. ................................. 376/409; 376/416; 376/417
[58] Field of Search ............... 376/409, 416, 412, 417

[56] References Cited

U.S. PATENT DOCUMENTS

| | | | |
|---|---|---|---|
| 4,445,942 | 5/1984 | Cheng et al. | 376/416 |
| 4,659,540 | 4/1987 | Cheng et al. | 376/417 |
| 4,876,064 | 10/1989 | Taylor | 420/422 |
| 4,986,957 | 1/1991 | Taylor | 376/417 |
| 5,073,336 | 12/1991 | Taylor | 376/417 |
| 5,190,721 | 3/1993 | Cheng | 376/417 |

Primary Examiner—Donald P. Walsh
Assistant Examiner—Frederick H. Voss
Attorney, Agent, or Firm—J. S. Beulick

[57] ABSTRACT

The present invention provides a cladding having an outer circumferential substrate, a zirconium barrier layer metallurgically bonded to the inside surface of the substrate and an inner circumferential liner metallurgically bonded to the zirconium barrier. The inner circumferential liner is more ductile than conventional Zircaloy. The low ductility of the inner circumferential liner is obtained, for example, by using a zirconium alloy containing a low tin content (e.g. less than 1.2% by weight) and/or a low oxygen content (e.g. less than 1000 ppm). The inner circumferential liner is less than about 25 micrometers thick.

58 Claims, 3 Drawing Sheets

INNER LINERS FOR FUEL CLADDING HAVING ZIRCONIUM BARRIERS LAYERS

This invention relates to cladding for use in nuclear fuel elements. More particularly, the invention relates to cladding having a substrate, a zirconium barrier layer metallurgically bonded to the inside surface of the substrate, and an inner liner metallurgically bonded to the zirconium barrier. The inner liner has improved resistance to crack initiation and propagation.

BACKGROUND OF THE INVENTION

Nuclear reactors have their fuel contained in sealed cladding for the isolation of the nuclear fuel from the moderator/coolant system. The term cladding, as used herein, refers to a zirconium based alloy tube. Often the cladding will be composed of various layers including a zirconium alloy substrate and an unalloyed zirconium barrier.

The cladding—nominally in the order of 0.030 inches thick—is formed in the shape of a tube with the nuclear fuel contained typically in pellet form therein. These pellets are stacked in contact with one another for almost the entire length of each cladding tube, which cladding tube is in the order of 160 inches in length. Typically, the cladding tube is provided with springs for maintaining the axial position of the fuel pellets and so-called "getters" for absorbing fission gases. Thereafter, the internal portions of the fuel rod are pressurized with helium to help conduct the heat from the fuel material to the cladding.

Zirconium and its alloys, under normal circumstances, are excellent for nuclear fuel cladding since they have low neutron absorption cross sections and, at temperatures below about 350° C., are strong, ductile, extremely stable and relatively nonreactive in the presence of demineralized water or steam. "Zircaloys" are a family of corrosion-resistant zirconium alloy cladding materials. They are composed of 98–99% by weight zirconium, with the balance being tin, iron, chromium, and nickel. "Zircaloy-2" and "Zircaloy-4" are two widely-used zirconium-based alloys for cladding. Zircaloy-2 has on a weight basis about 1.2 to 1.7 percent tin; 0.12 percent iron; 0.09 percent chromium and 0.05 percent nickel. Zircaloy-4 has essentially no nickel and about 0.2% iron but is otherwise substantially similar to Zircaloy-2.

Splitting of Zircaloy cladding may occur due to the interactions between the nuclear fuel, the cladding, and the fission products produced during the nuclear reaction. It has been found that this undesirable performance is due to localized mechanical stresses on the fuel cladding resulting from differential expansion and friction between the fuel and the cladding. These localized stresses and strain in the presence of specific fission products, such as iodine and cadmium, are capable of producing cladding failures by phenomena known as stress corrosion cracking and liquid metal embrittlement.

To combat this problem, some cladding includes barrier layers having low neutron absorption formed on the tubing inner surfaces. Cladding containing barrier layers is sometimes referred to as "composite" cladding. The barrier layer is typically a moderately pure zirconium (such as sponge zirconium) or sometimes highly pure zirconium (such as crystal bar zirconium) sheath metallurgically bonded to the inner surface of the tubing. The pioneering work on barrier layer cladding is described in U.S. Pat. Nos. 4,200,492 and 4,372,817 to Armijo and Coffin, 4,610,842 to Vannesjo, and 4,894,203 to Adamson.

Barrier layers have been found to effectively prevent damage to the cladding due to interaction with the pellet. However, if the cladding wall is compromised in some manner (e.g. perforated or split), and water enters the fuel rod interior, the protection afforded by the barrier layer can be reduced. This is because the steam produced by water within the fuel rod can rapidly oxidize the barrier layer.

The mechanical initiation of a cladding breach can be attributed to various causes. A breach can start when debris such as wires or metallic shavings or particles find their way into reactor water that flows within the fuel bundles between the fuel rods. The debris may lodge at a fuel rod spacer adjacent the cladding wall. As a result, the debris vibrates or frets against the cladding wall under the influence of the passing steam/water mixture. Such vibration continues until the cladding wall is penetrated. Corrosion also can be the source of crack initiation and propagation. Moreover, manufacturing defects can be the points of crack origin. Still further, crack propagation can start on the inside of the fuel rods in the corrosive high pressure environment present during in service reactor life.

To protect the zirconium barrier from oxidation should a cladding breach occur, it has been proposed to use a three layer structure. In addition to the substrate and zirconium barrier, a corrosion resistant inner liner bonded to the fuel side of the barrier is employed. Typically, the inner layer will be made from a Zircaloy. If the cladding is breached and steam forms in the fuel rod interior, the inner liner will protect the barrier from rapid oxidation. Although this three layer design represents a significant advance, certain problems remain. For example, when exposed to fission products, Zircaloy inner liners sometimes serve as a site for crack initiation and propagation. If a crack in the inner liner becomes sufficiently deep (achieving a "critical length" or "critical depth"), it can propagate through the zirconium barrier and possibly through the entire cladding. It should be noted that the terms "critical length" and "critical depth" used herein refer to cracks in the radial direction of the liner wall.

Thus, there exists a need for cladding having an inner liner which protects the barrier layer from oxidation and at the same time resists crack initiation and propagation at the cladding fuel side.

SUMMARY OF THE INVENTION

The present invention provides a cladding having an outer circumferential substrate, a zirconium barrier layer metallurgically bonded to the inside surface of the substrate and an inner circumferential liner metallurgically bonded to the zirconium barrier. The inner circumferential liner is more ductile than conventional Zircaloy and therefore has improved resistance to crack initiation and propagation due to pellet-cladding interaction. Preferably the inner circumferential liner is a zirconium alloy having a reduced tin and/or oxygen content in the liner alloy.

In another aspect of the invention, the thickness of the inner liner is maintained below the critical depth for crack propagation. The critical depth is, as noted above, the length at which the crack in the liner can propagate through the zirconium barrier and possibly through the entire cladding. To avoid the possibility of cracks in the liner attaining the critical length, the inner liner thickness is preferably less than about 30 micrometers and more preferably less than about 20 micrometers.

Further details and embodiments of the invention are provided in the following discussion and associated drawings.

DESCRIPTION OF THE SPECIFIC EMBODIMENTS

I. THE TUBING STRUCTURE

As used herein, the term "tubing" refers to a metal tube having various uses, and the term "fuel rod container" or simply "container" refers to tubing used in fuel rods to enclose fuel pellets. Sometimes the fuel rod container is referred to as "cladding" or "cladding tube".

Figure 1:
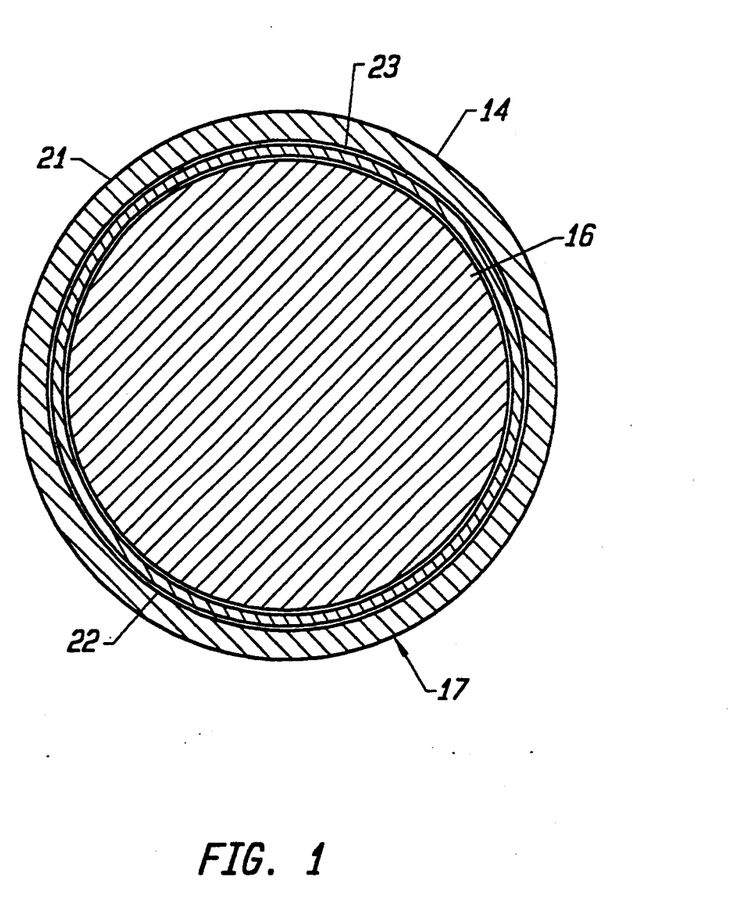
FIG. 1 is a cross sectional view of a nuclear fuel element of this invention having a substrate, a barrier layer, and an inner liner.

Referring to FIG. 1, a fuel element 14 (commonly referred to as a fuel rod) includes a fuel rod container 17 surrounding a fuel material core 16. The fuel element 14 is designed to provide excellent thermal contact between the fuel rod container 17 and the fuel material core 16, a minimum of parasitic neutron absorption, and resistance to bowing and vibration which is occasionally caused by flow of coolant at high velocity. The fuel material core is typically a plurality of fuel pellets of fissionable and/or fertile material. The fuel core may have various shapes, such as cylindrical pellets, spheres, or small particles. Various nuclear fuels may be used, including uranium compounds, thorium compounds and mixtures thereof. A preferred fuel is uranium dioxide or a mixture comprising uranium dioxide and plutonium dioxide.

The container 17 is a composite cladding having a structure including a substrate 21, a zirconium barrier 22, and an inner layer or liner 23. The substrate forms the outer circumferential region of a cladding tube, the inner layer forms as inner circumferential region of the cladding tube, and the zirconium barrier is located therebetween.

The substrate may be made from a conventional cladding material such as a stainless steel or zirconium alloy. Suitable zirconium alloys for the substrate preferably include at least about 98% zirconium, up to about 0.25% iron, up to about 0.1% nickel, and up to about 1.7% tin (all percents by weight). Other alloying elements may include niobium, bismuth, molybdenum, as well as various other elements used in the art. Most generally, any zirconium alloy with suitable corrosive resistance to BWR water and with sufficient strength and ductility may be employed.

In a preferred embodiment of this invention, the substrate is Zircaloy-2 or Zircaloy-4. In other preferred embodiments, "Zirlo"—a zirconium based alloy containing about 1% tin, about 1% niobium, and less than about 0.2% iron—is employed. Other exemplary substrate alloys include zirconium/2.5% niobium, "NSF" alloys (about 1% tin, about 0.2-0.5% ion, about 0.05% nickel, about 0.6-1% niobium, and the balance zirconium), "Valloy" (about 0.1% iron, about 1.2% chromium, and the balance zirconium), and "Excel" or "Excellite" (about 0.3% niobium, about 0.3 molybdenum, about 1.2 to 1.5% tin, and the balance zirconium). Still other exemplary alloys include various bismuth-containing zirconium alloys such as those described in U.S. Pat. No. 4,876,064 issued to Taylor on Oct. 24, 1989. These alloys include, for example, (1) about 0.5 to 2.5 weight percent bismuth, (2) about 0.5 to 2.3 weight percent of a mixture of bismuth and tin plus about 0.5 to 1.0 weight percent of solute which may be niobium, molybdenum, tellurium, or mixtures thereof, or (3) about 0.5 to 2.5 weight percent of a mixture of tin and bismuth plus about 0.3 to 1.0 weight percent tellurium.

In some preferred embodiments, the substrate will have a microstructure (i.e. precipitate size distribution) that resists corrosion and/or crack propagation. It is known that the microstructure of Zircaloys and other alloys can be controlled by the anneal temperature and time as well as other fabrication parameters. It is also known that in boiling water reactors (BWRs), smaller precipitates generally provide superior resistance to corrosion while in pressurized water reactors (PWRs), larger precipitates generally provide improved resistance to corrosion. In either environment, coarse precipitates provide improved resistance to axial crack propagation. In a preferred embodiment, the substrate will have a dense distribution of fine precipitate (e.g., between about 0.01 and 0.15 micrometers in diameter) in the outer circumferential region and a less dense distribution of coarse precipitates (e.g., between about 0.2 and 1 micrometers in diameter) in the interior circumferential region. This embodiment will be especially preferred in BWRs. In PWRs, preferred substrates will have coarse precipitates distributed throughout. Detailed discussions of Zircaloy microstructure and methods of fabricating cladding having a desired microstructure are found in U.S. patent application Ser. No. 08/052,793 entitled ZIRCALOY TUBING HAVING HIGH RESISTANCE TO CRACK PROPAGATION and U.S. patent application Ser. No. 08/052,791 entitled METHOD OF FABRICATING ZIRCALOY TUBING HAVING HIGH RESISTANCE TO CRACK PROPAGATION, both of which were filed on Apr. 23, 1993, assigned to the assignee hereof, and are incorporated herein by reference for all purposes.

Metallurgically bonded on the inside surface of substrate 21 is the zirconium barrier 22. The barrier, together with the inner liner, shields the substrate from the nuclear fuel material inside the composite cladding. Fuel pellet-induced stress may be introduced by, for example, swelling of the pellets at reactor operating temperatures so that the pellet presses against the cladding. In effect, the zirconium barrier deforms plastically to relieve pellet-induced stresses in the fuel element during swelling. The barrier also serves to inhibit stress corrosion cracking and protects the cladding from contact and reaction with such impurities and fission products. The zirconium barrier maintains low yield strength, low hardness, and other desirable structural properties even after prolonged use because it is resistant to radiation hardening.

In preferred embodiments, the thickness of the barrier layer is between about 50 and 130 micrometers (approximately 2.5 mils) and more preferably between about 75 and 115 micrometers (approximately 3.2 to 4.7 mils). In a typical cladding, the zirconium barrier forms between about 5% to about 30% of the thickness or cross-section of the cladding.

Generally, the zirconium barrier layer may be made from unalloyed zirconium possessing the desired structural properties. Suitable barrier layers are made from "low oxygen sponge" grade zirconium, "reactor grade sponge" zirconium, and higher purity "crystal bar zirconium". Generally, there are at least 1,000 parts per million (ppm) by weight and less than about 5,000 ppm impurities in sponge zirconium and preferably less than 4,200 ppm. Oxygen is preferably kept within the range of about 200 to about 800 ppm. Other typical impurity levels include the following: aluminum—75 ppm or less; boron—0.4 ppm or less; cadmium—0.4 ppm or less; carbon—270 ppm or less; chromium—200 ppm or less; cobalt—20 ppm or less; copper—50 ppm or less; hafnium—100 ppm or less; hydrogen—25 ppm or less; iron—350 ppm or less; magnesium—20 ppm or less; manganese—50 ppm or less; molybdenum—50 ppm or less; nickel—70 ppm or less; niobium—100 ppm or less; nitrogen—80 ppm or less; silicon—100 ppm or less; tin—50 ppm or less; tungsten—100 ppm or less; titanium—50 ppm or less; and uranium—3.5 ppm or less.

Sponge zirconium is typically prepared by reduction with elemental magnesium at elevated temperatures at atmospheric pressure. The reaction takes place in an inert atmosphere such as helium or argon. Crystal bar zirconium is produced from sponge zirconium by converting the zirconium metal in sponge zirconium to zirconium tetraiodide vapor and then decomposing the iodide on an incandescent wire. Crystal bar zirconium is more expensive than sponge zirconium, but has few impurities and has greater resistance to radiation damage.

Metallurgically bonded to the inside surface of the zirconium barrier 22 is the inner liner 23. As shown, the inner liner is the portion of the composite cladding closest to the nuclear fuel material 16. This layer protects the zirconium barrier from rapid oxidation should the fuel element interior come in contact with steam. Thus, the inner liner should be a relatively corrosion resistant material such as Zircaloy. For purposes of this invention, however, the inner liner should be softer than conventional Zircaloy so that crack initiation and propagation on the inner surface of the cladding tube are minimized.

Although the inner liner should be softer than conventional Zircaloy, it is preferably harder than the zirconium barrier. This permits the tube to be machined, honed, etc. more easily than the softer unalloyed zirconium. Thus, the inner layer of this invention provides the additional benefit of permitting various fabrication steps to be performed more easily than is possible with a naked zirconium barrier.

The inner liner can be formed from a variety of zirconium alloys. Suitable alloys should be resistant to corrosion in steam at 300°–400° C. and relatively soft in comparison to conventional Zircaloys. Many zirconium alloys of specified composition meet these criteria. Generally, alloys containing low concentrations of alloying metals (e.g. Cr, Ni, Nb, Sn) and/or oxygen will be softer. However, care should be taken in reducing the alloying elements to levels that might substantially diminish the corrosion resistance of the alloy. One preferred class of zirconium alloys has a relatively low tin concentration in comparison to corresponding structural alloys (e.g. Zircaloys used in cladding substrates).

Preferred low-tin inner liner compositions will be zirconium alloys having less than about 1.2% tin by weight. More preferably, the alloys will have between about 0.3 to 1.2% tin, and most preferably about 0.8% tin. One class of suitable alloys include at least about 98% zirconium, up to about 0.24% iron and less than about 1.2% tin (all percents by weight). Some liner alloys will also contain between about 0.05 and 0.15 chromium and/or between about 0.03 and 0.08 nickel. Other additives may include niobium, bismuth, and molybdenum, as well as various other elements used in the art. Examples of suitable alloys from this class include low tin modified Zircaloys. Preferably, the tin concentration in such modified Zircaloys will be between about 0.5 and 1.2% by weight, and more preferably between about 0.8 and 1.0% by weight. In two specific preferred embodiments the tin contents in the modified Zircaloys are about 0.8% and about 1.0% by weight, respectively. In other preferred Zircaloys, the concentration of iron in the alloy will be reduced. For example, a modified Zircaloys-2 will contain less than about 0.12 percent iron, and we believe preferably between about 0.02 and 0.1% iron by weight. A modified Zircaloy-4 will contain less than about 0.2% iron, and we believe preferably between about 0.02 and 0.12% iron by weight. Because iron, as well as nickel and chromium, can provide some corrosion resistance, its concentration preferably will not be lowered to the point where corrosion resistance is significantly compromised in the modified Zircaloys.

Other preferred zirconium alloys have reduced oxygen concentrations. Generally, lower oxygen contents in the liner alloy translates to greater resistance to cracking. In commercially available Zircaloy, the oxygen concentration is made purposely high, about 1000 ppm by weight, so that the Zircaloy is sufficiently strong to withstand the stresses encountered by a cladding tube. Because the inner liners of the structures of this invention need not be particularly strong, the oxygen content of these liner can be reduced to values substantially below that of conventional structural alloys. Zircaloy inner liners of the present invention therefore preferably contain less than about 1000 ppm, more preferably less than about 800 ppm, and most preferably less than about 600 ppm oxygen by weight. Of course, the hardness of other, non-Zircaloy, zirconium alloys can be reduced by decreasing the oxygen and tin concentrations.

In addition to the modified Zircaloys described above, relatively soft and corrosion resistant zirconium alloys suitable for the inner liners of this invention include the dilute iron-chrome alloys, the Zirlos (as described above), and modified versions of these alloys having reduced tin and oxygen contents. Dilute iron-chromium zirconium alloy liners preferably contain about 0.07 to 0.24% iron and about 0.05 to 0.15% chromium by weight. One example of such alloy includes about 0.1% iron, about 0.05% chromium, and/or about 0.04% nickel. Such alloys are described in U.S. patent application No. 08/011,559 (filed on Feb. 1, 1993, naming Rosenbaum, Adamson, and Cheng as inventors, and assigned to the assignee of this application). Still other suitable alloys are the bismuth containing zirconium alloys disclosed in U.S. Pat. No. 4,876,064 (containing between about 0.5 and 2.5 weight % bismuth as discussed above in connection with the substrate). Preferably, the bismuth-containing alloys will be relatively soft. Thus, they will often have relatively low tin and-/or oxygen contents.

The inner liner should be sufficiently thin that microcracks are prevented from reaching critical depth. If a crack in the inner liner exceeds the critical depth, it could propagate beyond the inner liner and into the barrier and even the substrate. The critical depth varies depending upon the particular alloy from which the inner liner is made. In general, so long as the inner layer can maintain its corrosion resistance, thinner layers are preferred. The critical depth for modified Zircaloy inner liners of this invention is less than about 30 micrometers, and preferably less than about 20 micrometers. With some fabrication methods, it may be impractical to produce liners thinner than about 10 micrometers. Thus, the inner liner thickness will often be limited to between about 10 and 20 micrometers thick. It should be recognized, however, that thinner layers can be produced with slightly modified fabrication methods such as those employing vapor deposition techniques.

In one example, the cladding tube total thickness is about 700 micrometers (approximately 28 mils), of which the inner liner or layer occupies less than 15 micrometers (approximately 0.6 mils) and the zirconium barrier occupies about 75 to 115 micrometers (approximately 3.2 to 4.7 mils).

Figure 2:
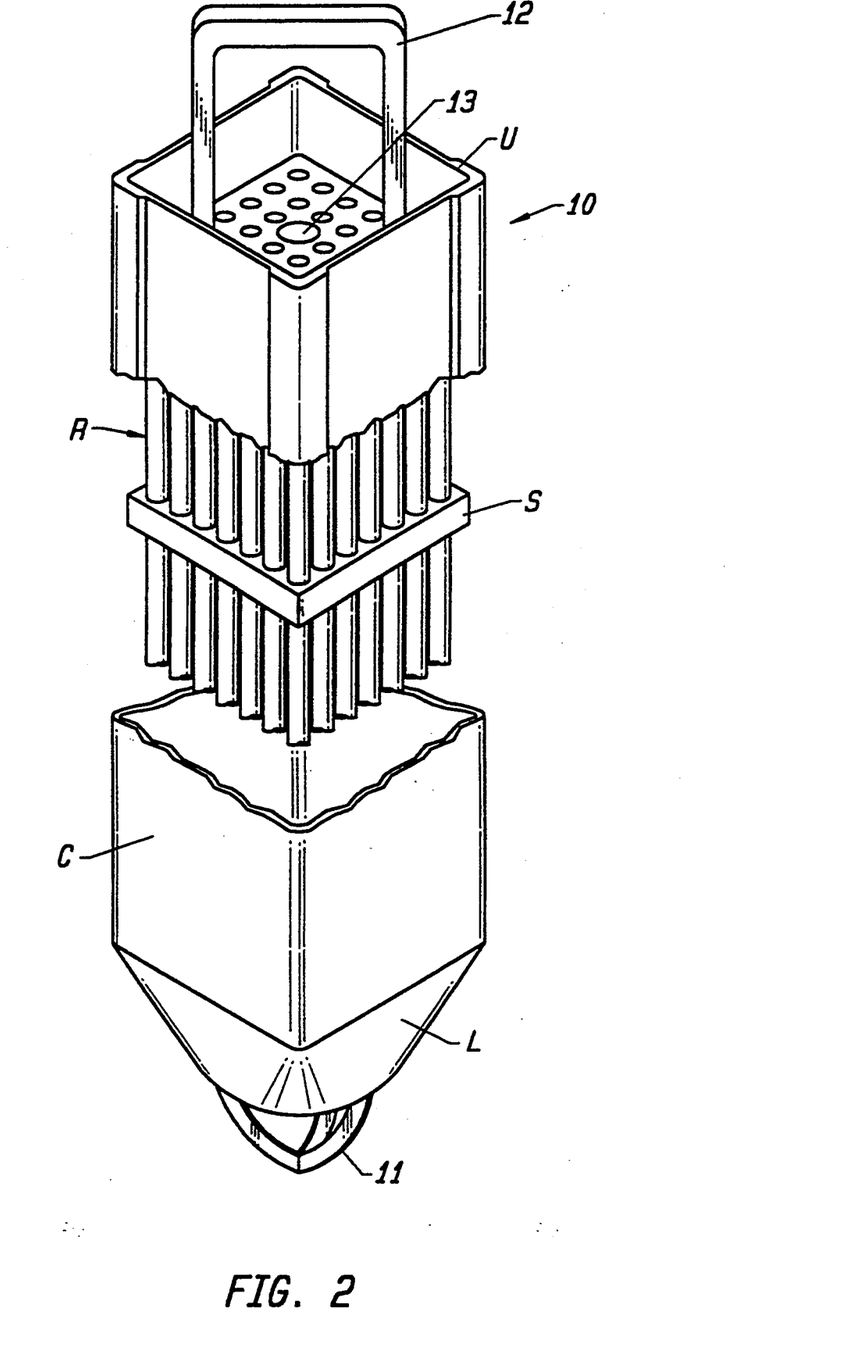
FIG. 2 is a partial cutaway perspective view of a nuclear fuel bundle containing a nuclear fuel rod.

Referring now to FIG. 2, a cutaway sectional view of a nuclear fuel bundle or assembly 10 is shown. The fuel bundle is a discrete unit of fuel containing many individual sealed fuel elements or rods R each containing a cladding tube of this invention. In addition, the fuel bundle consists of a flow channel C provided at its upper end with an upper lifting bale 12 and at its lower end with a nose piece L and lower lifting bale 11. The upper end of channel C is open at 13 and the lower end of the nose piece is provided with coolant flow openings. The array of fuel elements or rods R is enclosed in channel C and supported therein by means of upper tie plate U and lower tie plate (not shown). Certain of the fuel rods serving to "tie" the tie plates together—thus frequently being called "tie rods" (not shown). In addition, one or more spacers S may be disposed within the flow channel to hold the fuel elements in alignment with one another and the flow channel. During the in service life of the fuel bundle, the liquid coolant ordinarily enters through the openings in the lower end of the nose piece, passes upwardly around fuel elements R, and discharges at upper outlet 13 in partially vaporized condition.

Figure 3:
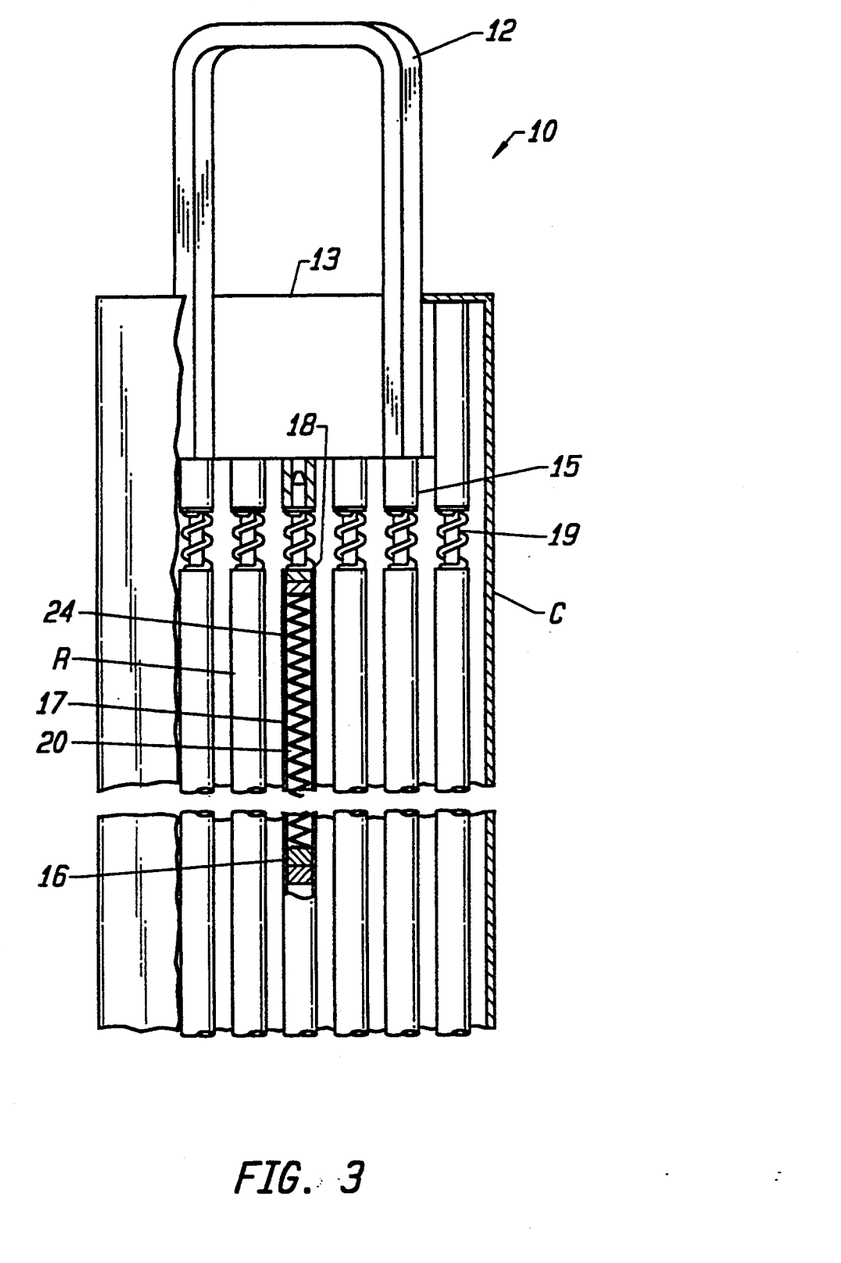
FIG. 3 is a partial cutaway sectional view of a nuclear fuel bundle showing the interior of a fuel rod.

Referring now to FIG. 3, the fuel elements or rods R are sealed at their ends by end plugs 18 welded to the fuel rod container 17, which may include studs 19 to facilitate the mounting of the fuel element in the fuel assembly. A void space or plenum 20 is provided at one end of the element to permit longitudinal expansion of the fuel material 16 and accumulation of gases released by the fuel material. A getter (not shown) is typically employed to remove various deleterious gases and other products of the fission reaction. A nuclear fuel material retainer 24 in the form of a helical member is positioned within space 20 to provide restraint against axial movement of the pellet column during handling and transportation of the fuel element.

An important property of the composite cladding of this invention is that the foregoing improvements are achieved with a negligible to moderate neutron penalty (depending on choice of barrier material). Such a cladding is readily accepted in nuclear reactors since the cladding would have minimal eutectic formation (depending on choice of barrier material) in the substrate portion of the cladding during a loss of cooling accident or an accident involving the dropping of a nuclear control rod. Further, the composite cladding has a very small heat transfer penalty in that there is no thermal barrier to transfer of heat such as results in the situation where a separate foil or liner is inserted in a fuel element. Also the composite cladding of this invention is inspectable by conventional non-destructive testing methods during various stages of fabrication.

In addition to the foregoing, because zirconium and the zirconium alloy are selected for the structure, the inside and outside surfaces of the composite cladding are compatible with manufacturing processes for light water nuclear reactor cladding and this enables the use of current manufacturing procedures, lubricants, etchants, etc.

MANUFACTURE OF THE TUBING

Various methods can be used to fabricate the cladding tubes of this invention. Suitable methods should produce sufficient cross diffusion between the substrate and the metal barrier and between the metal barrier and the inner liner to form metallurgical bonds, but insufficient cross diffusion to alloy with the metal barrier itself. Typically, the barrier and inner liner are provided as cylindrical tubes or sleeves that are bonded to the inside surface of a hollow zirconium alloy billet (which forms the substrate in the final cladding). Preferably, the components are bound to one another by coextrusion, but other methods may be employed. For example, the components can also be bonded to the billet by hot isostatic pressing or explosive bonding. In another method, the barrier and inner liner sleeves are bonded to the billet inner surface by heating (such as at 750° C. for 8 hours) to give diffusion bonding between the tubes and the billet. Prior to bonding (by, for example, extrusion), the barrier and inner liner sleeves preferably are joined to the billet at their ends by a bonding process such as electron beam welding in a high vacuum. Electron beam welding is a conventional process in which an electron beam is used to heat the ends of the cylindrical tubes until they fuse.

Extrusion is accomplished by putting the tube through a set of tapered dies under high pressure at about 1000° to 1400° F. (about 538° to 760° C.). Suitable extruders are available from Mannessmann Demang, Coreobolis, Pa. After extrusion, the composite is subjected to a conventional annealing and tube reduction processes to produce a product known as a "tubeshell" which is available in specified dimensions and compositions from various vendors such as Teledyne Wahchang (Albany, Oreg. USA), Western Zirconium (A Westinghouse company of Ogden, Utah), and Cezus (France).

To obtain the final tubing of the necessary dimensions, various manufacturing steps such as cold-working, heat treating, and annealing may be employed. The equipment and operating conditions necessary to carry out these various steps will be readily apparent to those of skill in the art, and are described in U.S. patent application Ser. No. 08/091,672 entitled METHOD FOR MAKING FUEL CLADDING HAVING ZIRCONIUM BARRIER LAYERS AND INNER LINERS which was filed on Jul. 14, 1993, the same day as the instant application, is assigned to the assignee hereof and is incorporated herein by reference for all purposes. One suitable method of tube reduction involves three passes of about 65 to 80% cold work (conducted with a Pilger mill) followed in each case by a stress relief or recrystallization anneal.

A specific preferred process according to this invention is now described. It should be understood that although the conditions described in this example are quite specific, each step of the process could be conducted under a range of conditions. The process is started with a hollow Zircaloy billet of approximately six to ten inches in diameter and two feet in length. The billet will form the substrate of a structure by the end of the process. At that point, the billet will be converted to about 400 feet of tubing having about a one-half inch outer diameter.

First, the billet is rapidly quenched. Generally, the quench involves heating the billet above about 1000° C., and then rapidly cooling from 1000° C. to about 700° C. by immersion in a tank of water. The quench rate is important between 1000° C. and 700° C.; after 700° C. is reached, however, the rate of cooling can be increased or decreased as desired.

Next, a tube of the metal selected to be the zirconium barrier is inserted into the hollow billet of the material selected to be the substrate, and a tube of the material selected to be the inner liner is inserted into the metal barrier tube. The ends of the billet, barrier, and inner liner tubes are then bonded by electron beam welding as described above. The welded tube is extruded with the tube temperature being at about 570° C. to a diameter of about 3 inches. The extruded tube is further annealed and cold worked to produce a tubeshell of about 2.5 inches in diameter.

The tubeshell—which has a zirconium barrier and inner liner bonded therein—is subjected to a first of three cold work passes. The tubeshell is passed through a pilger mill. It will be understood by the reader that pilger mills are generally available, albeit fairly complicated, pieces of equipment. During cold working with a pilger mill, a shaped die is rolled on the outside of the tube while a hard tapered mandrel supports the inside of the tube. In this manner, the wall thickness and diameter of the tube are simultaneously reduced.

Typically about 69% cold work is performed in the first pass. This percent value is roughly analogous to the percent reduction of the wall thickness. If the tube is given any more cold work without stress relief, it may likely crack during manufacture. To relieve the stress caused by cold working, the tube is annealed at about 593° C. for two hours in a large vacuum annealing furnace such as is available from Centorr Vacuum Industries, located in Nashua, N.H.

Next, the tube is heat treated at about 927° C. on the outer 30% of the wall. This is accomplished by heating the tubeshell with a high-energy or frequency (from an induction coil) which penetrates about 33% of the wall. During the induction heating water flows through the tube center. This serves two purposes: first it maintains the interior of the tube at a lower temperature while the outer region is heated, and second it very rapidly quenches the entire tube when the heating energy is removed. It is important to recognize that the inner portion of the tubeshell is not substantially heated. Further details of the induction heating process are provided in U.S. Pat. No. 4,576,654 to Eddens which is incorporated herein by reference for all purposes. This selective heating step imparts corrosion resistance to the outer region of the substrate by producing fine precipitates therein.

Regarding the cooling of the tube, any fluid which is generally inert with respect to the zirconium alloy or barrier material can be used. For example, a gas coolant, water, or even stream can be used in such a process.

At this point, a second pass cold work is performed (this time to about 74%) with a pilger mill. To remove the stress induced by this second pass cold work step, another anneal (again at 593° C. for about 2 hours) is performed. Finally, the third pass cold work is performed as before. This reduces the tube to its final size—about one-half inch outer diameter with a nominal wall thickness of roughly 30 mils.

This tube is cut up into lengths for fuel rods (i.e. about 14 feet long) and given a final recrystallization anneal at 577° C. for about two hours. Alternatively, the final anneal could be a stress relief anneal conducted at any temperature between about 480° C. to 577° C. After the final anneal, the tube is ready for use in the reactor.

It will be recognized by those of skill in the art that various steps are performed in addition to those listed in the above processes. For example, chemical etching is employed to remove superficial defects caused by the tube reduction mill. Further, straightening of tubes is often performed with pieces of equipment designed for this purpose. In addition, various nondestructive tests such as corrosion tests and ultrasonic tests for crack imperfections in the surface are performed. This is not an exhaustive list, but merely serves to describe some steps which may be employed.

The composite tubing of this invention can be used to make nuclear fuel elements by first affixing a closure to one end of the tubing so that only one open end remains. The completed fuel element is prepared by filling the cladding container with nuclear fuel material, inserting a nuclear fuel material retaining means into the cavity, applying a closure to the open end of the container leaving the cavity in communication with the nuclear fuel, and then bonding the end of the clad container to the closure to form a tight seal therebetween.

CONCLUSION

Although the foregoing invention has been described in some detail for purposes of clarity of understanding, it will be apparent that certain changes and modifications may be practiced within the scope of the appended claims. For instance, although the specification has described preferred zirconium alloy tubes, other shapes may be used as well. For example, plates and metal sections of other shapes may also be used. The Zircaloys and other alloys described above are examples of alloys that can advantageously be used as tubing in the present invention. Some other zirconium-based alloys as well as certain other metal alloys having similar structures can in many instances also employ the structure described herein to resist damage to the fuel side of the cladding.

What is claimed is:

1. A cladding tube having a cross-section, the cladding tube comprising:
   an outer circumferential substrate having an inner surface;
   a zirconium barrier layer bonded to the inner surface of the outer circumferential substrate and itself having an inner surface; and
   an inner circumferential liner bonded to the inner surface of the zirconium barrier layer, wherein the inner circumferential liner comprises a zirconium alloy having less than about 1.2% tin by weight.

2. The cladding tube of claim 1 wherein the inner circumferential liner is less than about 30 micrometers thick.

3. The cladding tube of claim 2 wherein the inner circumferential liner is less than about 20 micrometers thick.

4. The cladding tube of claim 3 wherein the inner circumferential liner is between about 10 and 15 micrometers thick.

5. The cladding tube of claim 1 wherein the zirconium barrier layer is between about 50 and 130 micrometers thick.

6. The cladding tube of claim 1 wherein the inner circumferential liner contains less than about 1000 ppm oxygen by weight.

7. The cladding tube of claim 6 wherein the inner circumferential liner contains less than about 600 ppm oxygen by weight.

8. The cladding tube of claim 1 wherein the substrate comprises a zirconium alloy selected from the group consisting of Zircaloy-2, Zircaloy-4, Zirlo, zirconium/2.5% niobium, NSF alloy, Valloy, Excel, and Excellite.

9. The cladding tube of claim 8 wherein the substrate comprises Zircaloy-2.

10. The cladding tube of claim 8 wherein the substrate comprises Zircaloy-4.

11. The cladding tube of claim 1 wherein the zirconium barrier layer is comprised of a material selected from the group consisting of crystal bar zirconium and sponge zirconium.

12. The cladding tube of claim 1 wherein the inner circumferential liner comprises at least about 98% zirconium by weight, between about 0.07 and 0.24% iron by weight, and less than about 1.2% tin by weight.

13. The cladding tube of claim 12 wherein the inner circumferential liner comprises a modified Zircaloy having a low tin content.

14. The cladding tube of claim 12 wherein the inner circumferential liner comprises between about 0.5 and 1.2% tin by weight.

15. The cladding tube of claim 12 wherein the inner circumferential liner comprise about 0.8% tin by weight.

16. The cladding tube of claim 1 wherein the inner circumferential liner comprises at least about 98% zirconium by weight, less than about 0.2% iron by weight, about 1% niobium by weight, and about 1% tin by weight.

17. The cladding tube of claim 1 wherein the inner circumferential liner comprises zirconium, about 0.07 to 0.24% iron and about 0.05 to 0.15% chromium by weight.

18. The cladding tube of claim 17 wherein the inner circumferential liner is comprised of a zirconium alloy having about 0.1% iron by weight and another alloying material selected from the group consisting of about 0.05% chromium by weight, about 0.04% nickel by weight, and a combination of about 0.04% nickel by weight plus about 0.05% chromium by weight.

19. The cladding tube of claim 1 wherein the inner circumferential liner comprises at least about 98% zirconium by weight and between about 0.5 and 2.5 weight percent bismuth.

20. A cladding tube having a cross-section, the cladding tube comprising:
an outer circumferential substrate having an inner surface;
a zirconium barrier layer bonded to the inner surface of the outer circumferential substrate and itself having an inner surface; and
an inner circumferential liner bonded to the inner surface of the zirconium barrier layer, wherein the inner circumferential liner comprises a zirconium alloy having less than about 1000 ppm oxygen by weight.

21. The cladding tube of claim 20 wherein the inner circumferential liner is less than about 20 micrometers thick.

22. The cladding tube of claim 21 wherein the inner circumferential liner is less than about 15 micrometers thick.

23. The cladding tube of claim 22 wherein the inner circumferential liner is between about 10 and 15 micrometers thick.

24. The cladding tube of claim 20 wherein the zirconium barrier layer is between about 50 and 130 micrometers thick.

25. The cladding tube of claim 20 wherein the inner circumferential liner contains less than about 800 ppm oxygen by weight.

26. The cladding tube of claim 25 wherein the inner circumferential liner contains less than about 600 ppm oxygen by weight.

27. The cladding tube of claim 20 wherein the substrate comprises a zirconium alloy selected from the group consisting of Zircaloy-2, Zircaloy-4, Zirlo, zirconium/2.5% niobium, NSF alloy, Valloy, Excel, and Excellite.

28. The cladding tube of claim 20 wherein the substrate comprises Zircaloy-2 or Zircaloy-4.

29. The cladding tube of claim 20 wherein the zirconium barrier layer is selected from the group consisting of crystal bar zirconium and sponge zirconium.

30. The cladding tube of claim 20 wherein the inner circumferential liner comprises at least about 98% zirconium by weight, between about 0.07 and 0.24% iron by weight, and less than about 1.1% tin by weight.

31. The cladding tube of claim 30 wherein the inner circumferential liner comprises a modified Zircaloy having a low tin content.

32. The cladding tube of claim 30 wherein the inner circumferential liner comprises between about 0.5 and 1.2% tin by weight.

33. The cladding tube of claim 20 wherein the inner circumferential liner comprises at least about 98% zirconium by weight, less than about 0.2% iron by weight, about 1% niobium by weight, and about 1% tin by weight.

34. The cladding tube of claim 20 wherein the inner circumferential liner comprises zirconium, about 0.07 to 0.24% iron and about 0.05 to 0.15% chromium by weight.

35. A cladding tube having a cross-section, the cladding tube comprising:
an outer circumferential substrate having an inner surface;
a zirconium barrier layer bonded to the inner surface of the outer circumferential substrate and itself having an inner surface; and
an inner circumferential liner of zirconium alloy bonded to the inner surface of the zirconium barrier layer, wherein the inner circumferential liner is less than about 20 micrometers thick.

36. The cladding tube of claim 35 wherein the inner circumferential liner is less than about 15 micrometers thick.

37. The cladding tube of claim 36 wherein the inner circumferential liner is between about 10 and 15 micrometers thick.

38. The cladding tube of claim 35 wherein the inner circumferential liner comprises at least about 98% zirconium by weight, between about 0.07 and 0.24% iron by weight, and less than about 1.2% tin by weight.

39. The cladding tube of claim 35 wherein the inner circumferential liner comprises a modified Zircaloy-2 having a low tin content.

40. The cladding tube of claim 35 wherein the inner circumferential liner comprises a modified Zircaloy-4 having a low tin content.

41. The cladding tube of claim 35 wherein the inner circumferential liner of zirconium alloy contains less than about 1000 ppm oxygen by weight.

42. The cladding tube of claim 35 wherein the zirconium barrier layer is selected from the group consisting of crystal bar zirconium and sponge zirconium.

43. A fuel element comprising:
a cladding tube including an outer circumferential substrate having an inner surface, a zirconium barrier layer bonded to the inner surface of the outer circumferential substrate and itself having an inner surface, and an inner circumferential liner of zirconium alloy bonded to the inner surface of the zirconium barrier layer, wherein the inner circumferential liner contains less than about 1.2% tin by weight;
nuclear fuel material disposed within said tube; and
means for sealing the respective ends of said tube with said nuclear material therein.

44. The fuel element of claim 43 wherein the cladding tube has a defined cross-section and wherein said inner circumferential liner is less than about 20, micrometers thick.

45. The fuel element of claim 43 wherein said inner circumferential liner comprises less than about 1000 ppm oxygen by weight.

46. The fuel element of claim 43 further comprising a pressurized gas within said nuclear fuel element.

47. The fuel element of claim 43 wherein the barrier layer is selected from the group consisting of crystal bar zirconium and sponge zirconium.

48. A nuclear fuel bundle comprising:
a lower tie plate for supporting an upstanding matrix of fuel rods and permitting the entry of water moderator;
an upper tie plate and permitting the exit of water and generated steam moderator;
a plurality of fuel rods, said fuel rods including a cladding tube including an outer circumferential substrate having an inner surface, a zirconium barrier layer bonded to the inner surface of the outer circumferential substrate and itself having an inner surface, and an inner circumferential liner of zirconium alloy bonded to the inner surface of the zirconium barrier layer, wherein the inner circumferential liner comprises less than about 1.2% tin by weight;
nuclear fuel material disposed within said zirconium alloy cladding tube;
means for sealing the respective ends of said tube with said nuclear material therein
one or more spacers disposed within said fuel bundle at varying elevations on said fuel bundle, said spacers surrounding and holding said array of fuel elements in designed center to center spacing; and,
means for tying said upper and lower tie plates together.

49. The nuclear fuel bundle of claim 48 further comprising a channel, said channel surrounding said fuel bundle from the vicinity of said lower tie plate to the vicinity of said upper tie plate to define a flow channel between said tie plates around said fuel elements.

50. A cladding tube having a cross-section, the cladding tube comprising:
an outer circumferential substrate having an inner surface;
a zirconium barrier layer bonded to the inner surface of the outer circumferential substrate and itself having an inner surface; and
an inner circumferential liner bonded to the inner surface of the zirconium barrier layer, wherein the inner circumferential liner comprises a zirconium alloy having less than about 0.12% iron by weight.

51. The composition of claim 50 wherein the inner circumferential liner comprises a modified Zircaloy-2 having a between about 0.02 and 0.1% iron by weight.

52. The composition of claim 50 wherein the inner circumferential liner comprises a modified Zircaloy-4 having a between about 0.02 and 0.12% iron by weight.

53. The cladding tube of claim 50 wherein the inner circumferential liner is less than about 15 micrometers thick.

54. The cladding tube of claim 50 wherein the inner circumferential liner contains less than about 600 ppm oxygen by weight.

55. The cladding tube of claim 50 wherein the substrate comprises a zirconium alloy selected from the group consisting of Zircaloy-2, Zircaloy-4, Zirlo, zirconium/2.5% niobium, NSF alloy, Valloy, Excel, and Excellite.

56. The cladding tube of claim 50 wherein the zirconium barrier layer is comprised of a material selected from the group consisting of crystal bar zirconium and sponge zirconium.

57. The cladding tube of claim 50 wherein the inner circumferential liner comprises a modified Zircaloy.

58. The cladding tube of claim 50 wherein the inner circumferential liner comprises less than about 1.2% tin by weight.

* * * * *